(12) United States Patent
Dailey

(10) Patent No.: US 7,739,592 B2
(45) Date of Patent: Jun. 15, 2010

(54) DELIVERY, ORGANIZATION, AND MANAGEMENT OF DATA CAPTURE ELEMENTS

(75) Inventor: Paul William Dailey, Grand Rapids, MI (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/271,687

(22) Filed: Nov. 10, 2005

(65) Prior Publication Data

US 2007/0106687 A1 May 10, 2007

(51) Int. Cl.
G06F 17/00 (2006.01)
(52) U.S. Cl. ............................... 715/248; 715/235
(58) Field of Classification Search ............... 715/202, 715/235, 236, 243, 248
See application file for complete search history.

(56) References Cited

U.S. PATENT DOCUMENTS

| | | | | |
|---|---|---|---|---|
| 5,617,528 | A * | 4/1997 | Stechmann et al. | 715/201 |
| 6,167,406 | A * | 12/2000 | Hoskins et al. | 707/102 |
| 6,397,217 | B1 * | 5/2002 | Melbin | 707/10 |
| 6,684,369 | B1 * | 1/2004 | Bernardo et al. | 715/205 |
| 6,725,383 | B2 | 4/2004 | Kyle | 713/202 |
| 6,834,285 | B1 | 12/2004 | Boris et al. | 707/103 R |
| 7,149,347 | B1 * | 12/2006 | Wnek | 382/159 |
| 7,197,515 | B2 * | 3/2007 | Rivers-Moore et al. | 707/200 |
| 7,246,311 | B2 * | 7/2007 | Bargeron et al. | 715/251 |
| 7,260,774 | B2 * | 8/2007 | Lambert et al. | 715/234 |
| 7,281,018 | B1 * | 10/2007 | Begun et al. | 707/102 |
| 7,313,757 | B2 * | 12/2007 | Bradley et al. | 715/234 |
| 7,383,226 | B2 * | 6/2008 | Kight et al. | 705/40 |
| 7,441,188 | B1 * | 10/2008 | Russell et al. | 715/273 |
| 7,496,840 | B2 * | 2/2009 | Hailey et al. | 715/243 |
| 7,577,938 | B2 * | 8/2009 | Bent et al. | 717/113 |
| 2001/0051962 | A1 * | 12/2001 | Plotkin | 707/522 |
| 2003/0058277 | A1 * | 3/2003 | Bowman-Amuah | 345/765 |

(Continued)

FOREIGN PATENT DOCUMENTS

CA 2372091 8/2005

(Continued)

OTHER PUBLICATIONS

Rutledge, Lloyd, et al, "Generating Presentation Constraints from Rhetorical Structure", Hypertext '00: Proceedings of the Eleventh ACM on Hypertext and Hypermedia, May 2000, pp. 19-28.*

(Continued)

*Primary Examiner*—Laurie Ries
(74) *Attorney, Agent, or Firm*—Yee & Associates, P.C.; John R. Pivnichny

(57) ABSTRACT

A computer implemented method, data processing system, and computer usable code are provided for dynamically creating data capture elements. The aspects of the present invention receive a request for a data capture form and retrieve template build data for building the data capture form to form retrieved template build data in response to receiving the request. Using the retrieved template build data, a form definition is retrieved to form a retrieved form definition and data element definition is retrieved to form a retrieved data element definition. Using at least one of the retrieved template build data, the retrieved form definition, and the retrieved data element definition, a data capture form template is then created.

13 Claims, 7 Drawing Sheets

U.S. PATENT DOCUMENTS

| | | | |
|---|---|---|---|
| 2003/0217117 A1* | 11/2003 | Dan et al. | 709/218 |
| 2004/0002907 A1* | 1/2004 | Tosswill | 705/34 |
| 2004/0268229 A1* | 12/2004 | Paoli et al. | 715/508 |
| 2004/0268238 A1* | 12/2004 | Liu et al. | 715/513 |
| 2006/0064631 A1* | 3/2006 | Parker | 715/500 |
| 2006/0288269 A1* | 12/2006 | Oppenlander et al. | 715/505 |
| 2007/0079236 A1* | 4/2007 | Schrier et al. | 715/517 |

FOREIGN PATENT DOCUMENTS

| | | |
|---|---|---|
| WO | 97/40617 | 10/1997 |
| WO | 03/105022 A2 | 12/2003 |

OTHER PUBLICATIONS

Zdun, Uwe, "Dynamically Generating Web Application Fragments From Page Templates", Symposium on Applied Computing, Proceedings of the 2002 ACM Symposium on Applied Computing, Madrid, Spain, 2002, pp. 1113-1120.*

Boiko, B., "Content Management Bible", XP002353632, Wiley Publishing, Inc., 2002.

"Custom Data Entry Form System for Software Applications", IBM Technical Disclosure Bulletin, IBM Corporation, New York, vol. 34, No. 11, Apr. 1992, pp. 384-385.

Fraternali, "Tools and Approaches for Developing Data-Intensive Web Applications: A Survey", ACM Computing Surveys, vol. 31, No. 3, Sep. 1999, pp. 227-263.

Fraternali et al., "Model-Driven Development of Web Applications: The Autoweb System", Acm Transactions on Information Systems, vol. 28, No. 4, Oct. 2000, pp. 323-382.

Hung et al., "Web Customization Using Behavior-Based Remote Executing Agents", WWW2004, May 2004, New York, USA, ACM 1-58113-844-X/04/0005, pp. 694-703.

* cited by examiner

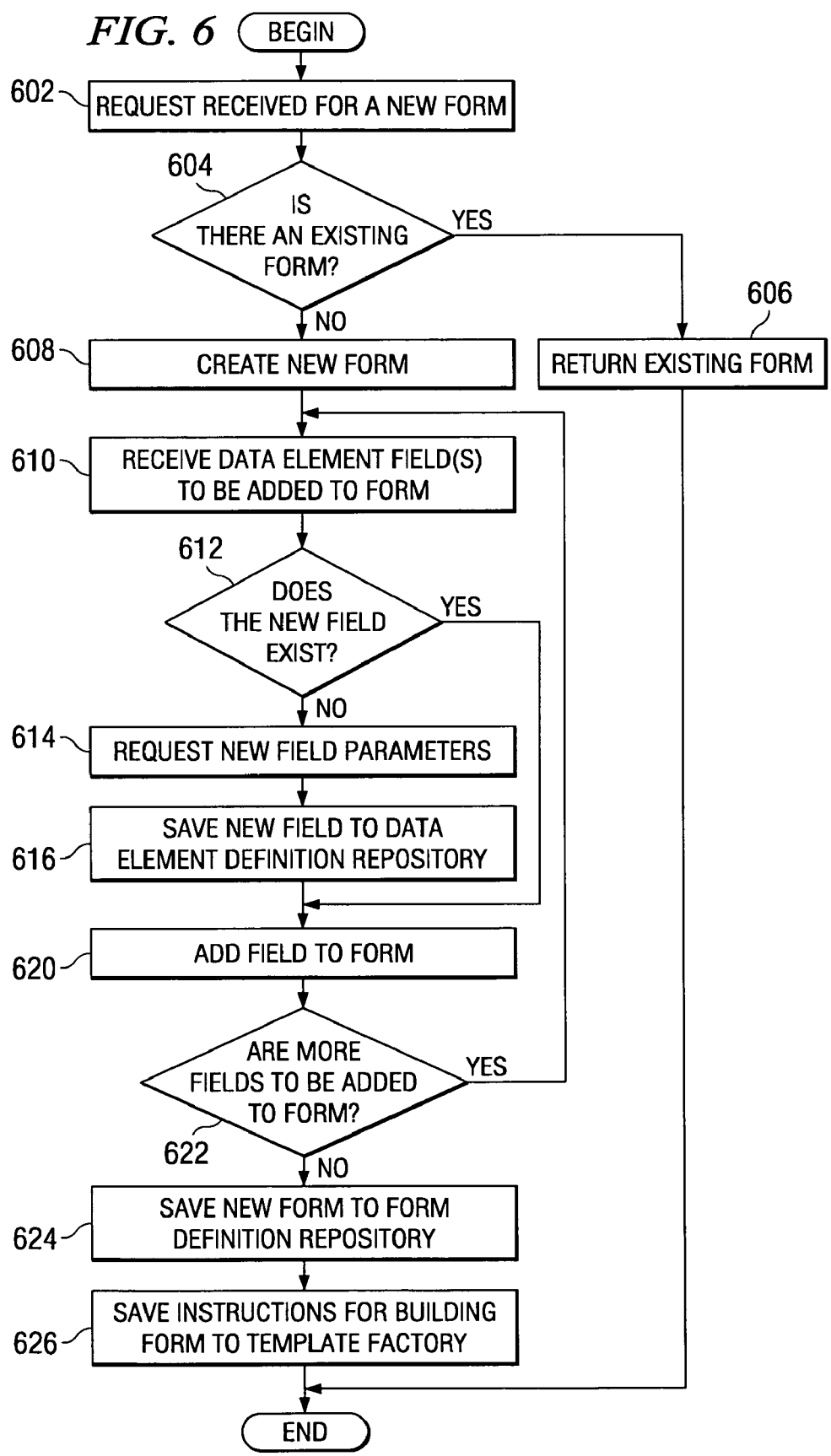

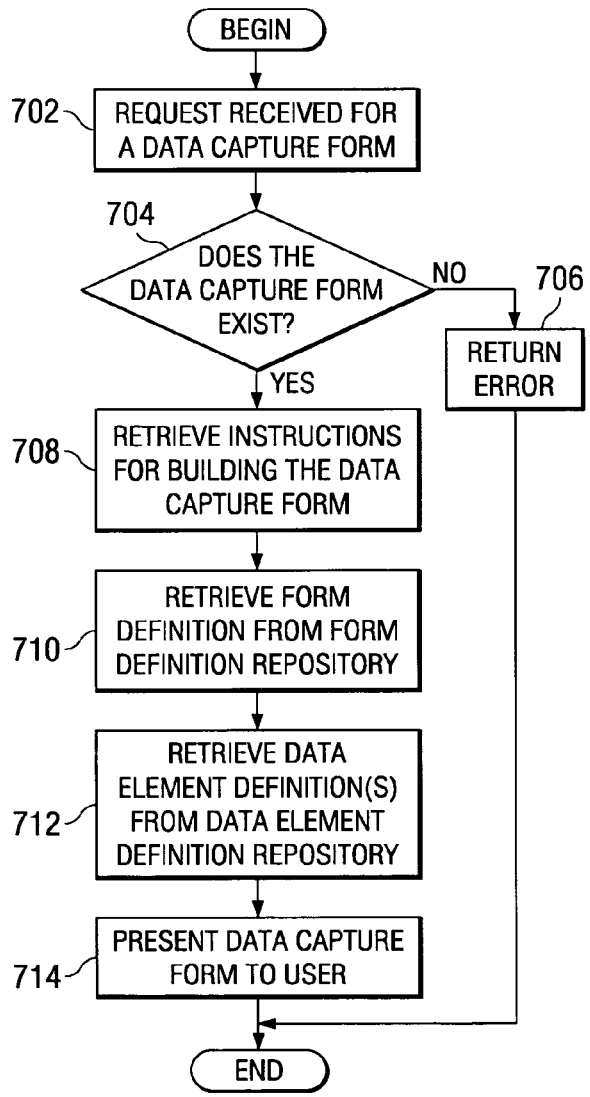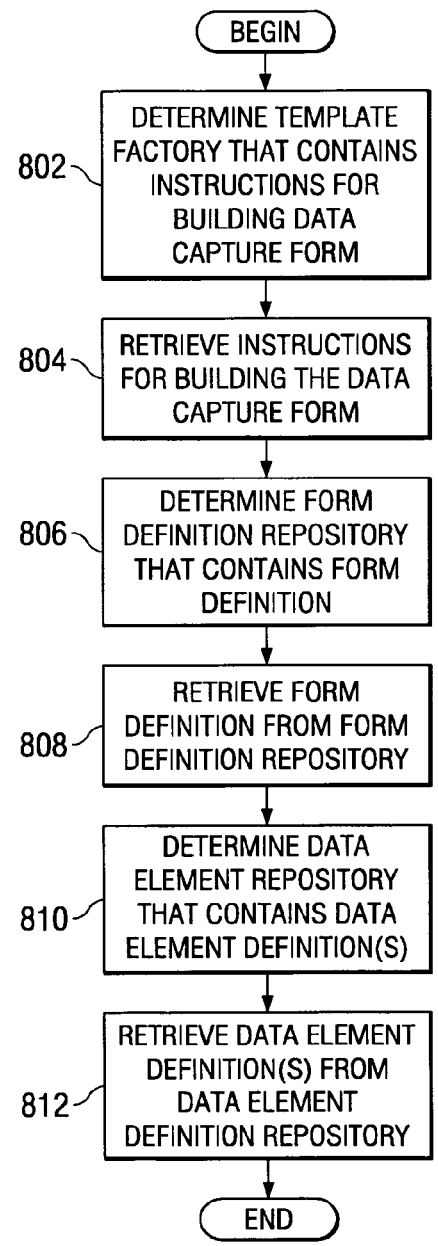

FIG. 9A

902 { call_template_factory_router.ipl-type example

904
```
use ibm_tf_example_factory;
use ibm_tf_different_example_factory;
use ibm_tf_yet_another_example_factory;

GetOptions ("type:s");
$opt_type=$opt_type || "none";
if($opt_type eq "example"){
  &ibm_tf_example();
}
if($opt_type eq "diff_example"){
  &ibm_different_example ();
}
if($opt_type eq "ya_example"){
  &ibm_yet_another_example();
}
```

900

906
```
package ibm_tf_example_factory;
@EXPORT=qw(ibm_tf_example);

use lib "/usr/interwoven/iw-home/custom/lib";
use ibm_meta_xml_repository;
use ibm_core_xml_repository;
use_ibm_common_xml_repository;
sub ibm_tf_example
{
```

908
```
%COMMON=(
 'ibm_introduction'=>sub{
   print<<"EOF";
     <item name="Introduction" colspan="5">
     <label>Introduction</label>
     <database deploy-column="f"/>
     <description>Introductory text.</description>
     <textarea rtf="t" required="f" cols="400"
       rows="200" external-editor="visualformat"
       external-editor-config="generic.xml"/>
     </item>
EOF
 },
```

FROM FIG. 9A

900

910:
```
sub ibm_example
{
 print<<EOF;
   <?xml version="1.0" encoding="UTF-8"?>
   <substitution>
     <ruleset name="Example One">
     <description>
        This is and example template.
     </description>
EOF
  eval{
    $META{'ibm_title'}->();
    $CORE{'ibm_ssi_include'}->();
    $COMMON{'ibm_introduction'}->();
  };
```

912:
```
 print<<"EOF";
   <container combination="and" hide-name="f"
name="MetadataBlock">
     <label>Metadata</label>
EOF
 eval {
    $META{'ibm_creator'}->();
    $META{'ibm_owner'}->();
  };
 print<<"EOF";
   </container>
```

DELIVERY, ORGANIZATION, AND MANAGEMENT OF DATA CAPTURE ELEMENTS

BACKGROUND OF THE INVENTION

1. Field of the Invention

The present invention relates generally to data templates. More particularly, the present invention relates to delivery, organization, and management of data capture templates.

2. Description of the Related Art

A positive presence on the Internet is an important aspect of business. Many types of services, such as product and service presentation, support offerings, self help, and contact information, may be combined to create an Internet business façade. An Internet business façade usually provides a customer's first impression and may be the only point of contact for the customer. Careful design and coordinated effort are critical for providing useful Web content. Business stakeholders may work with many different groups to achieve this end. One group in particular, subject matter experts, may provide the majority of the useful content. Subject matter experts are considered intelligent and good at their specific job, but may not have Web development experience.

In order to facilitate transfer of subject matter expert knowledge to Web content, many Web content management systems, referred to simply as "content management systems," provide data capture templates allowing direct contribution of Web content by the subject matter experts. In an example, Interwoven® Corp's TeamSite® product, and enterprise content management system, utilizes extensible markup language (XML) based data capture templates. Once data is captured in these templates, TeamSite® formats the information for the Web allowing the subject matter experts to ignore the details.

In an effort to accommodate different subject matter experts and their various content contributions, many different types of data capture templates are created and maintained. Typically, there are many similarities between the different templates allowing new interfaces to be copies and alterations of existing interfaces. This process results in data capture template development becoming a "copy-rename-modify" process with the result often an individual, non-reusable, maintenance point. When business requires broad changes, such as new Web standards or product releases, this large set of templates soon become cumbersome.

SUMMARY OF THE INVENTION

The different aspects of the present invention provide a computer implemented method, data processing system, and computer usable code for dynamically creating data capture elements. A request is received for a data capture form. In response to receiving the request, template build data is retrieved for building the data capture form to form retrieved template build data. A form definition is retrieved using the retrieved template build data to form a retrieved form definition and data element definition is retrieved using the retrieved template build data to form a retrieved data element definition. Then a data capture form template is created using at least one of the retrieved template build data, the retrieved form definition, and the retrieved data element definition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart of an exemplary form creation for data capture in accordance with an illustrative embodiment of the present invention;

FIG. 7 is a flowchart of an exemplary data capture in accordance with an illustrative embodiment of the present invention;

FIG. 8 is a flowchart of an exemplary data capture form retrieval in accordance with an illustrative embodiment of the present invention; and FIGS. 9A and 9B depict exemplary pseudo-code for data capture retrieval in accordance with an illustrative embodiment of the present invention.

DETAILED DESCRIPTION OF THE PREFERRED EMBODIMENT

Figure 1:
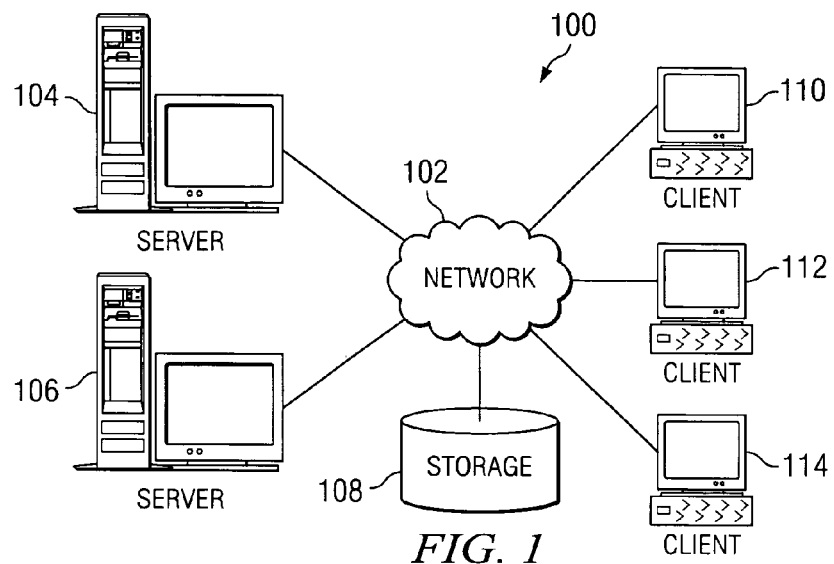
FIG. 1 depicts a pictorial representation of a network of data processing systems in which aspects of the present invention may be implemented.
Figure 2:
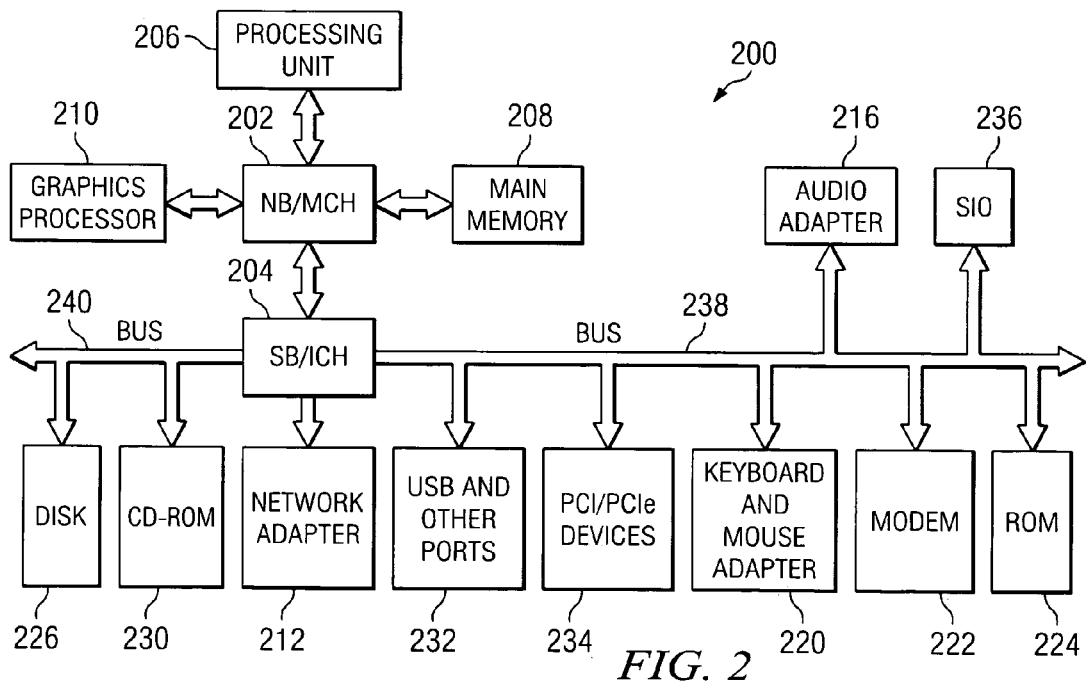
FIG. 2 depicts a block diagram of a data processing system in which aspects of the present invention may be implemented.

The present invention provides for delivery, organization, and management of data capture templates. FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a simple and scalable method for developing, maintaining, and presenting data capture templates. Aspects of the present invention move the data capture template from a static entity to a dynamic entity created on demand from a centralized pool of pre-configured resources. The resource pool contains a set of definitions of input fields created and maintained in a location central to the business stakeholders. Aspects of the present invention have the ability to supply many different kinds of templates and template component parts including metadata, headers, footers, navigation bars, style sheets, and any associated programming logic. Each input field definition may have many different properties including but not limited to size, length, input mask, and value lists. In short, a process is identified that allows business stakeholders to influence the different types of captured data pertinent to the business.

Figure 3:
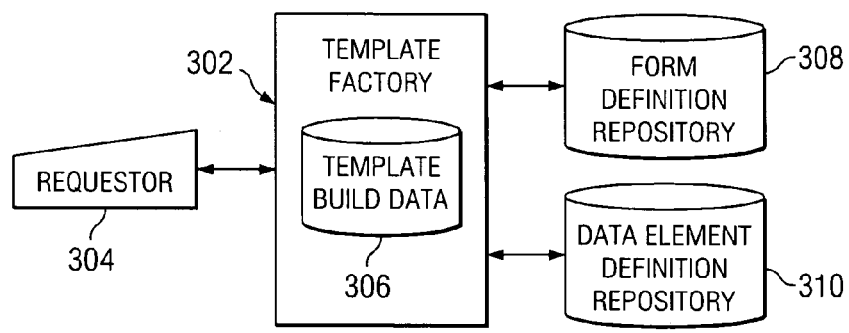
FIG. 3 depicts an exemplary functional block diagram of the components used to implement dynamic data capture templates in accordance with an illustrative embodiment of the present invention.

FIG. 3 depicts an exemplary functional block diagram of the components used to implement dynamic data capture templates in accordance with an illustrative embodiment of the present invention. In an aspect of the present invention template factory 302 receives a request from requester 304. Template factory 302 is an application that may be executed on a client, such as client 110, 112, or 114 of FIG. 1, or on a server, such as server 104 or 106, through network 102 of FIG. 1. The request from requester 304 indicates the particular data capture required by requester 304. Using data capture information associated with the particular data capture, template factory 302 uses internal template build data 306 to determine the form definition and the data element definition(s) required to build the particular data capture form.

The required form definition and the data element definition(s) are retrieved from form definition repository 308 and data element definition repository 310 respectively. Form definition repository 308 and data element definition repository 310 may be any type of data structure, such as storage 108 of FIG. 1 or main memory 208 of FIG. 2. Once the form definition and the data element definition(s) are retrieved from form definition repository 308 and data element definition repository 310, template factory 302 creates a data capture form template and presents the data capture template to requestor 304 through a graphical user interface.

Data elements are fields within a form that, such as intro field, title, sub-title, and phone number. Within data element definition repository 310, the naming convention of the data elements is critical, thus a taxonomy of the data element definitions is created. The data element definitions within data element definition repository 310 may be atomic and each data element definition includes all necessary information to generate the data element field. Additionally, the data element definition may incorporate other items from data element definition repository 310.

The form definition defines how the requested data capture will be presented to the user. Form definition includes items such as format, character style, font, and size, and background color. Within form definition repository 308, the naming convention of the forms is also critical, thus a taxonomy of the form definitions is created. The form definitions within form definition repository 308 may be atomic and each data form definition includes all necessary information to generate the form. Additionally, the form definition may incorporate other forms from form definition repository 308.

Template factory 302 contains the information necessary to create a particular data capture form, such as the required data element fields and form definitions. The data capture form is dynamic under the present configuration as either the template information in template factory 302, one or more data element field definitions in data element definition repository 310, or a form definition in form definition repository 308 may be updated at any time. However, by using the critical naming convention, a data capture template may be created using any update information.

Figure 4:
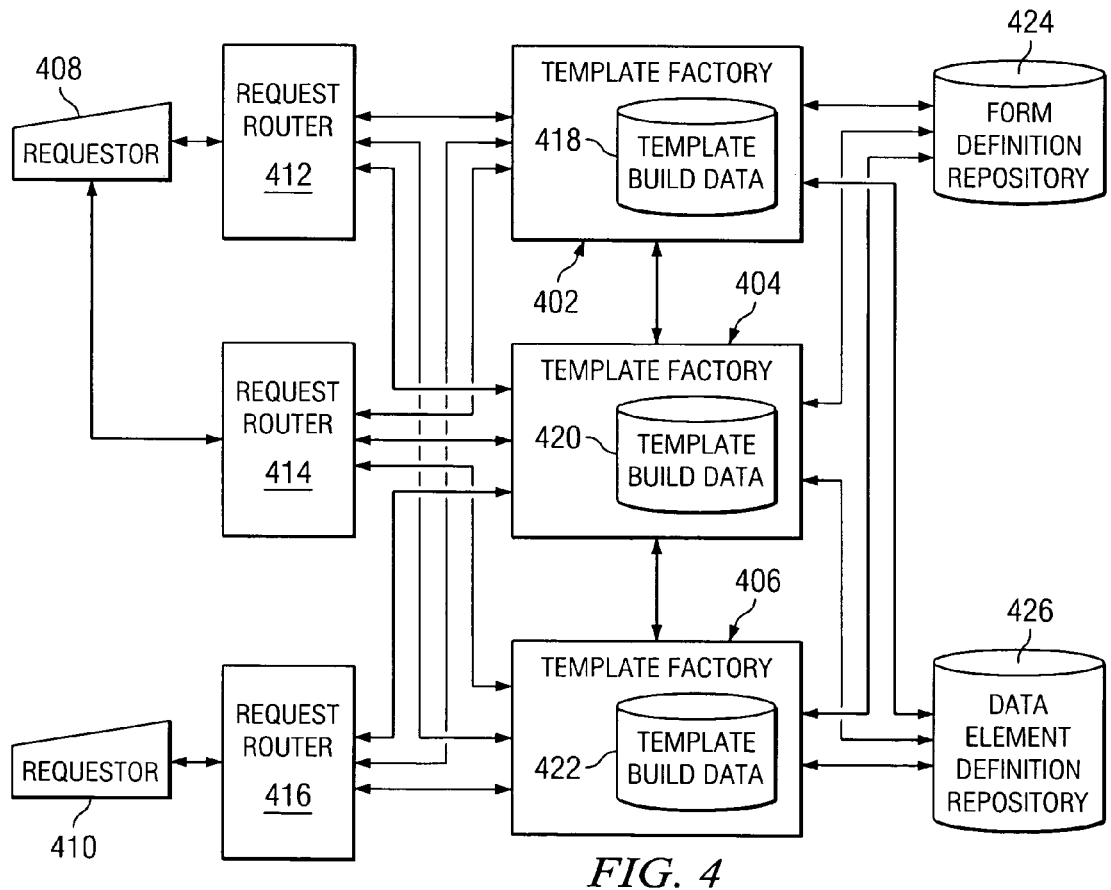
FIG. 4 depicts an alternative exemplary functional block diagram of the components used to implement dynamic data capture templates in accordance with an illustrative embodiment of the present invention.

In an alternative aspect of the present invention, FIG. 4 depicts an exemplary functional block diagram of the components used to implement dynamic data capture templates in accordance with an illustrative embodiment of the present invention. In this alternative aspect of the present invention, multiple template factories 402, 404, and 406 may be employed in dynamically providing data capture templates. Template factories 402, 404, and 406 are instances of an application that may be executed on a client, such as client 110, 112, or 114 of FIG. 1, or on a server, such as server 104 or 106, through network 102 of FIG. 1. A request may be issued from requester 408 or 410 and is immediately intercepted by one of request routers 412, 414, and 416. The request from requester 408 or 410 indicates the particular data capture required by requester 408 or 410.

Request routers 412, 414, and 416 analyze the request from requester 408 or 410, in order to route the request to the appropriate template factory 402, 404, or 406. Once the appropriate template factory is determined, request routers 412, 414, and 416 route the request to the determined template factory. Using data capture information associated with the particular data capture, the determined one of template factories 402, 404, or 406 uses internal template build data 418, 420, or 422 to determine the form definition and the data element definition(s) required to build the particular data capture form.

The required form definition and the data element definition(s) are retrieved from form definition repository 424 and data element definition repository 426 respectively. Form definition repository 424 and data element definition repository 426 may be any type of data structure, such as storage 108 of FIG. 1 or main memory 208 of FIG. 2. Once the form definition and the data element definition(s) are retrieved from form definition repository 424 and data element definition repository 426, one of template factories 402, 404, and 406 creates a data capture form template and presents the data capture template to requestor 408 or 410 through a graphical user interface.

Figure 5:
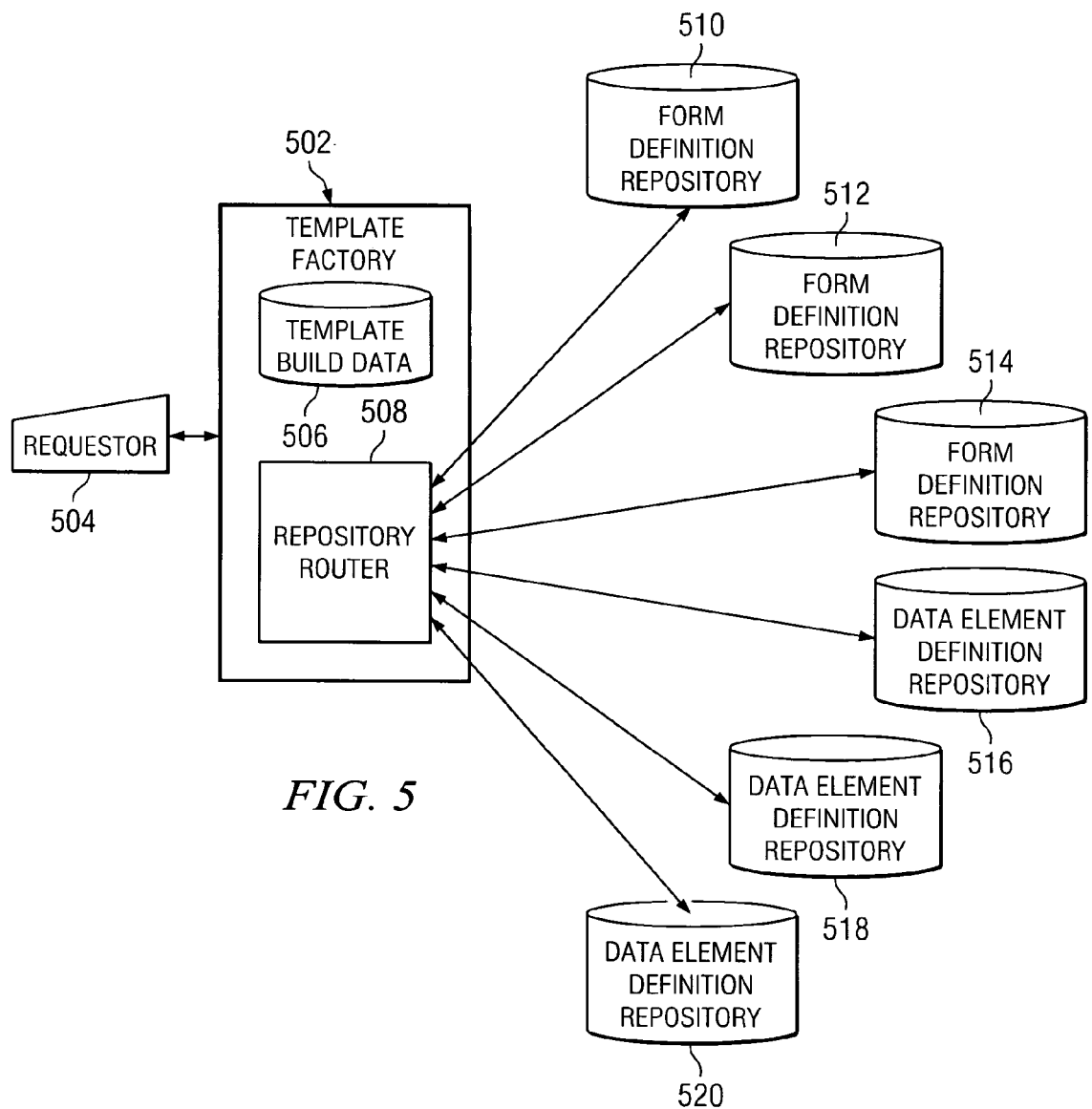
FIG. 5 depicts an alternative exemplary functional block diagram of the components used to implement dynamic data capture templates in accordance with an illustrative embodiment of the present invention.

In an alternative aspect of the present invention, FIG. 5 depicts an exemplary functional block diagram of the components used to implement dynamic data capture templates in accordance with an illustrative embodiment of the present invention. In an aspect of the present invention template factory 502 receives a request from requestor 504. Template factory 502 is an application that may be executed on a client, such as client 110, 112, or 114 of FIG. 1, or on a server, such as server 104 or 106, through network 102 of FIG. 1. The request from requester 504 indicates the particular data capture required by requester 504. Using data capture information associated with the particular data capture, template factory 502 uses internal template build data 506 to determine the form definition and the data element definition(s) required to build the particular data capture form.

As the number of form definitions and data element definitions increase over time or are stored on numerous data structures for security reasons, repository router 508 is employed to determine which of form definition repositories 510, 512, or 514 stores the required form definition. Repository router 508 is also employed to determine which of data element definition repositories 516, 518, and 520 stores the required data element definition(s). Once repository router 508 determines the appropriate repositories, the required form definition and the data element definition(s) are retrieved from one or more of form definition repositories 510, 512, and 514 and one or more of data element definition repositories 516, 518, and 520, respectively. Form definition repositories 510, 512, and 514 and data element definition repositories 516, 518, and 520 may be any type of data structure, such as storage 108 of FIG. 1 or main memory 208 of FIG. 2. Once the form definition and the data element definition(s) are retrieved from one of form definition repositories 510, 512, and 514 and one of data element definition repositories 516, 518, and 520, template factory 502 creates a data capture form template and presents the data capture template to requestor 504 through a graphical user interface.

FIG. 6 is a flowchart of an exemplary form creation for data capture in accordance with an illustrative embodiment of the present invention. The operation may be implemented in an application, such as template factory 302 in FIG. 3. As the operation begins, a request is received from a requestor by a template factory for the creation of a new form (step 602). The template factory first determines if a form exactly like or similar to the newly requested form may already exist (step 604). As described above, there may be numerous template factories, and, although the requestor may initiate a new form creation, there may already be an existing form that is not known to the requester. The determination whether or not a form already exists is based upon form creation standards that are controlled by a template factory administrator. Based on the form creation standards, the template factory is able to determine if an existing form is exactly like or similar to the requested form. If an existing form is sent to the requester but does not meet the needs of the requester, the requestor may be able to change the form request so that a new form will be created. If there is an existing form (step 604), then the existing form is returned to the user (step 606), with the operation terminating thereafter. If the new form is truly new to the template factory, the description of the new form is created (step 608).

Once the new form is created (step 608), new data elements field(s) are added to the form by the requester (step 610). As each data element field is added to the form, a determination is made as to whether the data element field being added exists in a data element definition repository, such as data element definition repository 310 of FIG. 3 (step 612). If the data element field being added is an existing data element field, the data element field is added to the form (step 620). If the data element field being added is a new data element field (step 612), the requester is prompted for the new field parameters (step 614). Once the parameters are entered by the requester, the new field and the associated field parameters are saved to the data element definition repository (step 616) and the field is added to the form (step 620).

A determination is then made as to whether more data element fields are to be added to the form (step 622). If there are more fields to be added, the operation returns to step 610. If there are no more data element fields that are to be added to the form (step 622), the new form is saved to the form definition repository (step 624). Then the template factory saves the instructions necessary to build the form within template build data within the template factory (step 626), with the operation terminating thereafter.

FIG. 7 is a flowchart of an exemplary data capture in accordance with an illustrative embodiment of the present invention. The operation may be implemented in an application, such as template factory 302 in FIG. 3. As the operation begins, a request is received from a requester for a data capture form (step 702). A determination is made as to whether the requested form exists within a template factory (step 704). If the requested form does not exist within the template factory, an error is returned to the requestor (step 706), with the operation terminating thereafter. At this point, the requester may be able to create a new form using the operation as described in FIG. 6. If at step 704, the requested form exists within the template factory, the instructions for building the requested form is retrieved from template build data, such as template build data 306 of FIG. 3, within the template factory (step 708).

Using the template build data, the template factory retrieves form definition data from a form definition repository, such as form definition repository 308 of FIG. 3 (step 710). Additionally, the template factory also retrieves data element definition(s) from a data element definition repository, such as data element definition repository 310 of FIG. 3 (step 712). Once all of the information necessary to build the form is retrieved, the template factory creates a data capture form template and presents the data capture form to the requester (step 714), with the operation terminating thereafter. The presentation of the data capture form may be in a graphical user interface.

FIG. 8 is a flowchart of an exemplary data capture form retrieval in accordance with an illustrative embodiment of the present invention. The operation may be implemented in an application, such as template factory 404 in FIG. 4. A request for a data capture form may be retrieved by a request router such as request router 412 of FIG. 4. As the operation begins, the request router determines a template factory that contains the requested data capture form (step 802). The appropriate template factory retrieves the instructions for building the requested form from template build data, such as template build data 420 of FIG. 4 (step 804). As more than one form definition repository may be connected to each template factory as shown in FIG. 5, a determination is made by a repository router within the template factory as to which form definition repository contains the requested form definition (step 806).

Using the template build data, the template factory retrieves form definition data from the appropriate form definition repository, such as form definition repository 518 of FIG. 5 (step 808). As more than one data element definition repository may also be connected to each template factory as shown in FIG. 5, a determination is made by a repository router within the template factory as to which data element definition repository contains the requested data element definition (step 810). The template factory then retrieves data element definition(s) from the appropriate data element definition repository, such as data element definition repository 512 of FIG. 5 (step 812). At this point the template factory has all of the information necessary to present the data capture form to the requestor via the request router, with the operation terminating thereafter.

FIGS. 9A and 9B depict exemplary pseudo-code for data capture retrieval in accordance with an illustrative embodiment of the present invention. In section 902, a request for a data capture form is initiated by a requestor, such as requester 408 of FIG. 4. In section 904, a request router, such as request router 412 of FIG. 4, sends the received request to the appropriate template factory, such as template factory 402 of FIG. 4. In section 906, a data element definition repository, such as data element definition repository 426 of FIG. 4, is accessed by the template factory to retrieve the required data element definitions. In section 908, the data element repository sends the requested data element definitions to the template factory. In section 910, the template factory builds the data capture form using the retrieved data element definitions. In section 912, the data capture form template is returned to the requester.

Thus, the many aspects of the present invention provide a simple and scalable method for developing, maintaining, and presenting data capture templates. The aspects of the present invention move the data capture template from a static entity to a dynamic entity created on demand from a centralized pool of pre-configured resources. The resource pool contains a set of definitions of input fields created and maintained in a location central to the business stakeholders. The aspects of the present invention have the ability to supply many different kinds of templates and template component parts including metadata, headers, footers, navigation bars, style sheets, and any associated programming logic. Each input field definition may have many different properties including but not limited to size, length, input mask, and value lists. In short, a process is identified that allows business stakeholders to influence the different types of captured data pertinent to the business.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamically creating data capture elements, the method comprising:
   receiving, at a request router, a request for a data capture form from a client device, wherein the request router is one of a set of request routers;
   identifying, by the request router, a template factory in a plurality of template factories, wherein the template factory contains template build data for building a data capture form template;
   forwarding the request from the request router to the template factory that contains the template build data;
   retrieving, by the template factory, template build data for building the data capture form to form retrieved template build data in response to receiving the request;
   identifying, by a repository router, a form definition from a plurality of form definitions, wherein the plurality of form definitions is stored in a plurality of form definition repositories;
   retrieving, by the template factory, the form definition using the retrieved template build data to form a retrieved form definition;
   identifying, by the repository router, a data element definition from a plurality of data element definitions, wherein the plurality of form definitions is stored in a plurality of data element definition repositories;
   retrieving, by the template factory, the data element definition using the retrieved template build data to form a retrieved data element definition; and
   creating, by the template factory, a data capture form template using the retrieved template build data, the retrieved form definition, and the retrieved data element definition.

2. The computer implemented method of claim 1, wherein the data element definition includes information to generate the data element field, the method further comprising:
   presenting the data capture form template to a requestor.

3. The computer implemented method of claim 1, further comprising:
   determining if a template for the data capture form exists in the template build data;
   responsive to a nonexistence of the template for the data capture form, creating a new data capture form template;
   saving instructions for building the new data capture form template to the template build data; and
   saving the form definition of the new data capture form template to the form definition repository.

4. The computer implemented method of claim 1, further comprising:
   receiving a second request to add a data element field to the data capture form;
   determining if the data element field exists in a data element definition repository;
   responsive to the nonexistence of the data element field, identifying parameters associated with the data element field;
   saving the data element field and the data element field parameters to the data element definition repository; and
   adding the data element field to the data capture form.

5. The computer implemented method of claim 1, wherein the data element definition is retrieved from a data element definition repository.

6. A data processing system comprising:
   a bus system;
   a communications system connected to the bus system;
   a memory connected to the bus system, wherein the memory includes a set of instructions; and
   a processing unit connected to the bus system, wherein the processing unit executes the set of instructions to receive, at a request router, a request for a data capture form from a client device, wherein the request router is one of a set of request routers; identify, by the request router, a template factory in a plurality of template factories, wherein the template factory contains template build data for building a data capture form template; forward the request from the request router to the template factory that contains the template build data; retrieve, by the template factory, template build data for building the data capture form to form retrieved template build data in response to receiving the request; identify, by a repository router, a form definition from a plurality of form definitions, wherein the plurality of form definitions is stored in a plurality of form definition repositories; retrieve, by the template factory, the form definition using the retrieved template build data to form a retrieved form definition; identify, by the repository router, a data element definition from a plurality of data element definitions, wherein the plurality of form definitions is stored in a plurality of data element definition repositories; retrieve, by the template factory, the data element definition using the retrieved template build data to form a retrieved data element definition; and create, by the template factory, a data capture form template using the retrieved template build data, the retrieved form definition, and the retrieved data element definition.

7. The data processing system of claim 6, wherein the data element definition includes information to generate the data element field, wherein the processing unit executes the set of instructions to present the data capture form template to a requestor.

8. The data processing system of claim 6, wherein the processing unit executes the set of instructions to determine if a template for the data capture form exists in the template build data; create a new data capture form template responsive to a nonexistence of the template for the data capture form; save instructions for building the new data capture form template to the template build data; and save the form definition of the new data capture form template to the form definition repository.

9. The data processing system of claim 6, wherein the processing unit executes the set of instructions to receive a second request to add a data element field to the data capture form; determine if the data element field exists in a data element definition repository; identify parameters associated with the data element field responsive to the nonexistence of the data element field; save the data element field and the data element field parameters to the data element definition repository; and add the data element field to the data capture form.

10. A computer program product comprising:
a computer usable medium including computer usable program code for dynamically creating data capture elements, the computer program product including:
computer usable program code for receiving, at a request router, a request for a data capture form from a client device, wherein the request router is one of a set of request routers;
computer usable program code for identifying, by the request router, a template factory in a plurality of template factories, wherein the template factory contains template build data for building a data capture form template;
computer usable program code for forwarding the request from the request router to the template factory that contains the template build data;
computer usable program code for retrieving, by the template factory, template build data for building the data capture form to form retrieved template build data in response to receiving the request;
computer usable program code for identifying, by a repository router, a form definition from a plurality of form definitions, wherein the plurality of form definitions is stored in a plurality of form definition repositories;
computer usable program code for retrieving, by the template factory, the form definition using the retrieved template build data to form a retrieved form definition;
computer usable program code for identifying, by the repository router, a data element definition from a plurality of data element definitions, wherein the plurality of form definitions is stored in a plurality of data element definition repositories;
computer usable program code for retrieving, by the template factory, the data element definition using the retrieved template build data to form a retrieved data element definition; and
computer usable program code for creating, by the template factory, a data capture form template using the retrieved template build data, the retrieved form definition, and the retrieved data element definition.

11. The computer program product of claim 10, wherein the data element definition includes information to generate the data element field, the computer program product further including:
computer usable program code for presenting the data capture form template to a requestor.

12. The computer program product of claim 10, further including:
computer usable program code for determining if a template for the data capture form exists in the template build data;
computer usable program code for creating a new data capture form template responsive to a nonexistence of the template for the data capture form;
computer usable program code for saving instructions for building the new data capture form template to the template build data; and
computer usable program code for saving the form definition of the new data capture form template to the form definition repository.

13. The computer program product of claim 10, further including:
computer usable program code for receiving a second request to add a data element field to the data capture form;
computer usable program code for determining if the data element field exists in a data element definition repository;
computer usable program code for identifying parameters associated with the data element field responsive to the nonexistence of the data element field;
computer usable program code for saving the data element field and the data element field parameters to the data element definition repository; and
computer usable program code for adding the data element field to the data capture form.

* * * * *